United States Patent [19]

Spanke et al.

[11] 4,122,926
[45] Oct. 31, 1978

[54] FLUID OPERATED CLUTCH AND BRAKE

[75] Inventors: Edwin A. Spanke, Oak Forest; Louis F. Carrieri, LaGrange Park; Melvin H. Francey, Palos Heights, Ala.L OF IL

[73] Assignee: Gulf & Western Manufacturing Company, Southfield, Mich.

[21] Appl. No.: 746,732

[22] Filed: Dec. 2, 1976

[51] Int. Cl.² ............................................. F16D 67/02
[52] U.S. Cl. .................................. 192/18 A; 192/12 R
[58] Field of Search .................. 192/18 A, 18 R, 12 R

[56] References Cited

U.S. PATENT DOCUMENTS

| | | | |
|---|---|---|---|
| 2,159,326 | 5/1939 | Harwood et al. | 192/18 A |
| 2,193,068 | 3/1940 | Keck | 192/18 A |
| 2,242,396 | 5/1941 | Johansen | 192/18 A |
| 2,252,906 | 8/1941 | Williamson | 192/18 A |
| 2,838,150 | 6/1958 | Eason | 192/18 A |
| 2,998,872 | 9/1961 | Sommer et al. | 192/18 A |
| 3,077,968 | 2/1963 | Ahern et al. | 192/18 A |
| 3,177,994 | 4/1965 | Jewson | 192/18 A |

*Primary Examiner*—John J. Camby
*Assistant Examiner*—Henry C. Yuen
*Attorney, Agent, or Firm*—Meyer, Tilberry & Body

[57] ABSTRACT

A press drive mechanism is disclosed having brake and clutch units including corresponding disc assemblies concentric with respect to the output shaft of the mechanism. A fluid operated piston-cylinder assembly concentric with the output shaft is operable to alternately actuate the brake and clutch units, and an auxiliary fluid operated piston-cylinder assembly is selectively operable to effect simultaneous actuation of the brake and clutch units.

22 Claims, 7 Drawing Figures

FLUID OPERATED CLUTCH AND BRAKE

This invention relates to the art of transmissions and, more particularly, to a brake and clutch mechanism for use with heavy machinery such as metalworking presses.

Clutch and brake drive mechanisms have of course been provided heretofore for use with heavy machinery such as presses. Such mechanisms generally include a drive shaft, a flywheel driven by a motor, a clutch unit for selectively connecting and disconnecting the flywheel and output shaft, and a brake unit for braking rotation of the output shaft when the clutch is actuated to disengage the flywheel and output shaft. The flywheel is continuously rotated by the drive motor and, accordingly, rotates relative to the output shaft when the brake unit is actuated to stop rotation of the output shaft.

Often, it is desirable to stop rotation of the flywheel when the output shaft of the drive unit is stopped. Some of the previous efforts in this direction have been directed to braking mechanisms associated directly with the flywheel. Other efforts have been directed to internal, independently actuated, clutch and brake mechanisms which enable independent actuation of the clutch mechanism when the output shaft is braked so as to stop the flywheel. Such previous efforts are undesirable for several reasons. For example, external braking mechanisms directly associated with the flywheel include dry friction linings which are air actuated to achieve the braking function. The dry lining materials are subject to rapid wear and, because of the heat generated by frictional engagement of the dry lining materials, an undesirably long time is required to stop the flywheel. Internal flywheel braking arrangements heretofore provided generally include a clutch actuator member adapted to be pressed against the clutch friction discs and an independent brake actuator member adapted to be pressed against the brake friction discs. While this enables simultaneous brake and clutch actuation to achieve simultaneous output shaft and flywheel braking functions, the independent relationship often leads to an overlap between the normal alternate clutching and braking functions which take place during continuous press operation when wheel stoppage is not desired. Additionally, if excessive brake disc wear exists, the force of the clutch actuator member against the clutch discs to achieve stoppage of the flywheel can cause the clutch to overpower the brake and thus stroke the press driven by the output shaft. Such overpowering can also occur if, in connection with the independent operation of the brake and clutch actuator members, an excessive pressure is applied to the clutch friction discs through the independent clutch actuator.

In accordance with the present invention, an improved clutch-brake-flywheel drive mechanism is provided which enables simultaneous stoppage of the flywheel and output shaft while overcoming the disadvantages of mechanisms heretofore provided for this purpose, including those specifically enumerated above. In this respect, a clutch-brake-flywheel drive mechanism in accordance with the present invention is comprised of clutch and brake disc assemblies concentric with the output shaft, and corresponding clutch and brake presser members. The presser members are interengaged for movement together in axially opposite directions and for axial movement relative to one another. Movement of the clutch and brake presser members together in one direction causes clutch engagement and brake release, and movement of the clutch and brake presser members together in the opposite direction causes brake engagement and clutch release. This interconnection of the clutch and brake presser members for movement together advantageously avoids overlap in the clutch and brake engaging and disengaging functions when stoppage of the flywheel is not desired. Relative axial movement between the clutch and brake presser members enables simultaneous actuation of the clutch and brake units, thus to achieve stoppage of the output shaft and the flywheel.

A primary actuator is provided for displacing the clutch and brake presser members together in axially opposite directions to achieve the alternate clutching and braking functions, and an auxiliary actuator is provided to achieve simultaneous clutch and brake actuation. The auxiliary actuator is selectively operable so as to achieve such simultaneous actuation only when stoppage of the flywheel is desired. When stoppage of the flywheel is desired, the primary and auxiliary actuators are cooperable to effect relative displacement between the clutch and brake presser members which enables the simultaneous clutching and braking functions.

In accordance with another aspect of the present invention, the primary and auxiliary actuators are structured and/or controlled to prevent the clutch overriding the brake, thus to avoid undesired rotation of the output shaft during stoppage of the flywheel. Preferably, the primary and auxiliary actuators are fluid operated piston-cylinder assemblies both actuable by fluid at a common pressure, and overriding of the clutch is prevented by providing for the force applied on the brake unit to be greater than the force applied to the clutch unit during stoppage of the flywheel.

Accordingly, an outstanding object of the present invention is the provision of a clutch-brake-flywheel drive mechanism having an improved clutch and brake actuating arrangement enabling alternate clutch and brake engagement and selective flywheel stoppage.

Another object is the provision of a drive mechanism of the foregoing character in which the clutch and brake units have a primary actuator to achieve alternate clutch and brake engagement, and an auxiliary actuator cooperable with the common actuator to achieve simultaneous clutch and brake engagement.

Yet another object is the provision of a drive mechanism of the foregoing character in which the clutch and brake units include corresponding clutch and brake presser members mechanically interconnected for movement together as a unit and for movement relative to one another, and wherein movement of the presser members together achieves alternate clutch and brake engagement without overlap, and relative movement between the presser members enables simultaneous clutch and brake engagement.

Still a further object is the provision of a drive mechanism of the foregoing character in which the primary and auxiliary actuators are operable to provide a greater braking force than clutching force during stoppage of the flywheel, thus to prevent the clutch from overpowering the brake.

Still a further object is the provision of a drive mechanism of the foregoing character in which the primary and auxiliary actuators include piston-cylinder assemblies operable by fluid at a common pressure and which assemblies are structured and interrelated to provide for the braking force during flywheel stoppage.

The foregoing objects, and others, will in part be obvious and in part more fully pointed out hereinafter in conjunction with the description of a preferred embodiment of the invention illustrated in the accompanying drawings in which.

Figure 1:
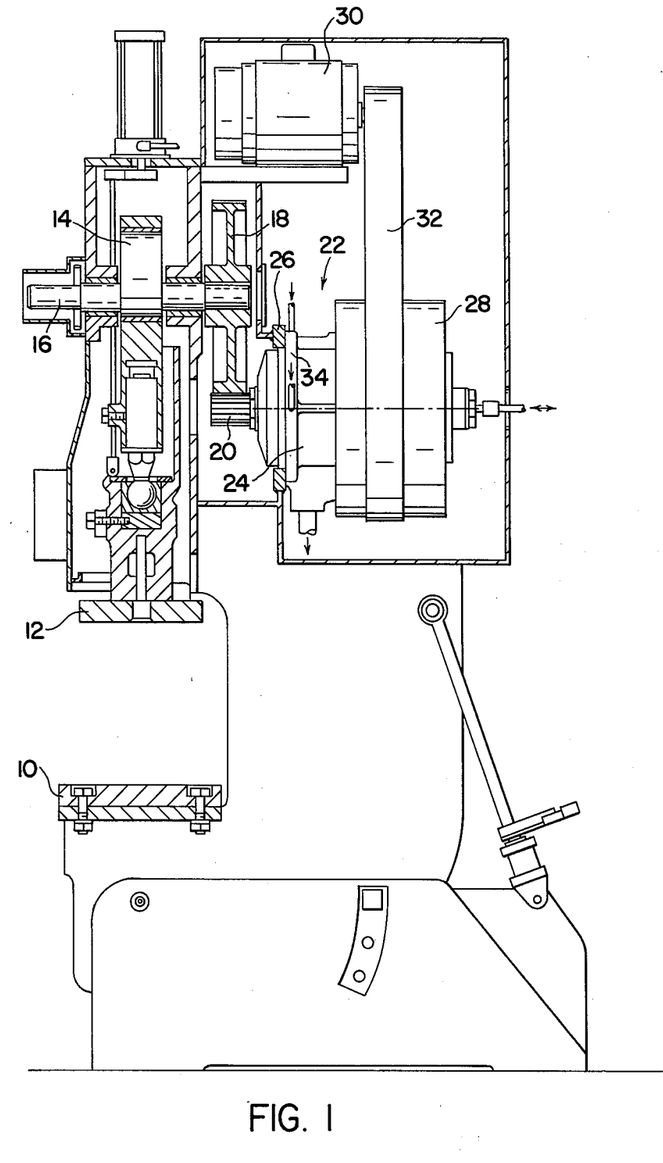
FIG. 1 is a side elevation view, partially in section, of a press and illustrating a drive mechanism of the present invention mounted thereon.

Referring now in greater detail to the drawings wherein the showings are for the purpose of illustrating a preferred embodiment of the present invention only and not for the purpose of limiting the invention, a metalworking press is illustrated in FIG. 1 of the drawing which includes a frame supporting a fixed platen 10 and a reciprocable tool supporting platen 12. The tool supporting platen is adapted to be reciprocated in a well known manner by means of a rotatable crank 14 having a shaft 16 which is supported for rotation by the press frame and is provided on one of its opposite ends with a drive gear 18. Accordingly, rotation of gear 18 rotates crank shaft 16 to impart reciprocating motion to tool support platen 12.

Gear 18 is adapted to be rotated by a pinion gear 20 which is coupled to the output shaft of a clutch-brake-flywheel drive mechanism 22 of the present invention. As described more fully hereinafter, drive mechanism 22 includes a housing 24 having an end wall by which the drive mechanism is removably interconnected with a mounting flange 26 of the press frame. Further, drive mechanism 22 includes a flywheel 28 rotatably supported by housing 24 and adapted to be driven by a suitable motor, such as electric motor 30, through a drive belt 32.

Figure 2:
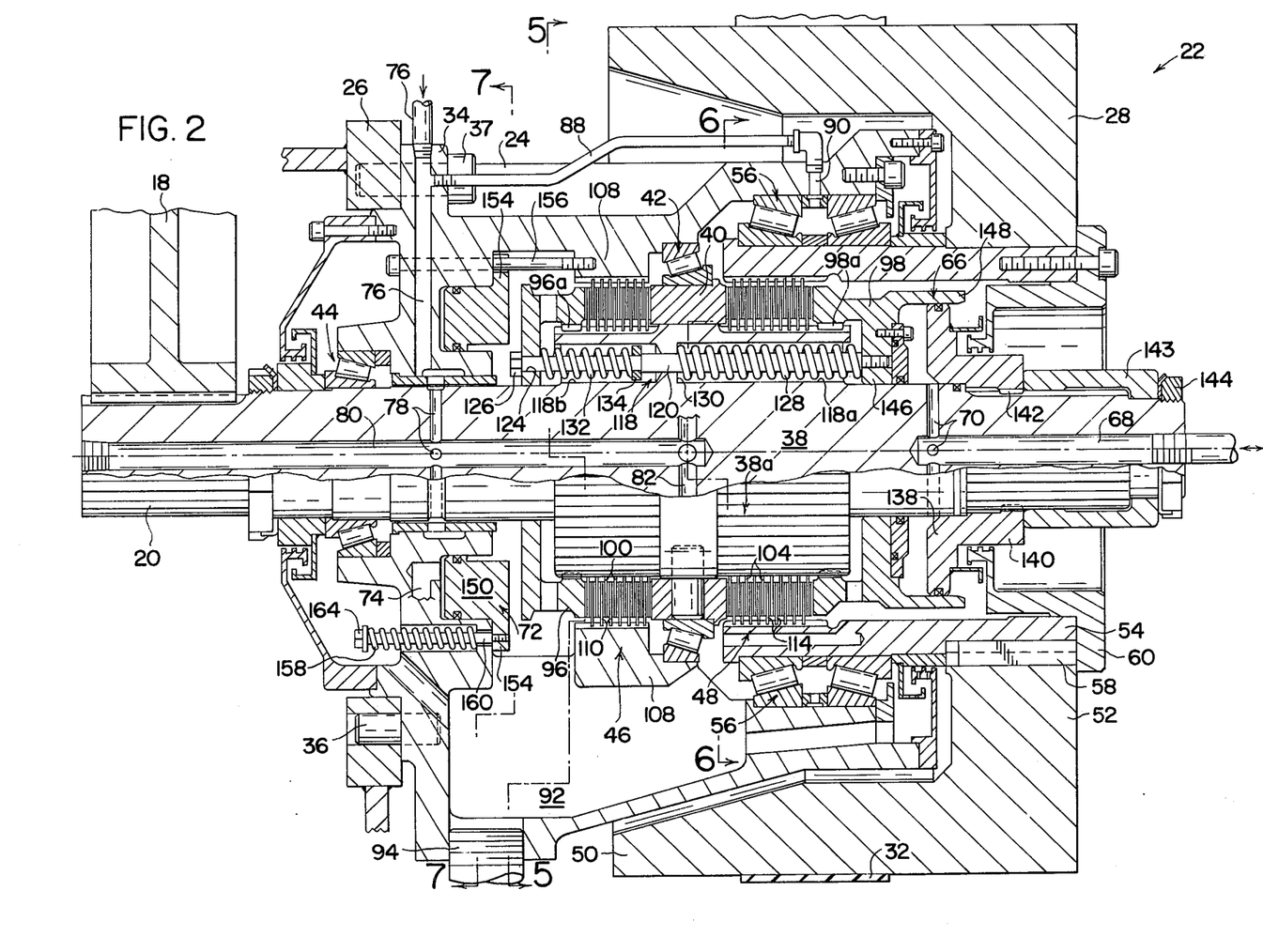
FIG. 2 is an elevational view, in section, of the drive unit illustrated in FIG. 1.

The general arrangement of the components of drive mechanism 22 is best illustrated in FIG. 2 of the drawing. With reference to FIG. 2, housing 24 is generally cylindrical in cross section and is provided at one end with a radially extending wall 34 facially engaging press flange 26. A pair of pins 36 are mounted on wall 34 and are received in corresponding openings in press flange 26 to align the drive mechanism with respect thereto, and a plurality of bolts 37 extend through wall 34 and into threaded engagement with corresponding openings in press flange 26 to interconnect the drive mechanism therewith.

Drive mechanism 22 further includes an output shaft 38 supported within housing 24 for rotation relative thereto. An intermediate portion 38a of shaft 38 is radially enlarged to support components of the clutch and brake units as described hereinafter, and an annular abutment ring 40 surrounds intermediate portion 38a and is suitably secured thereto for rotation with the output shaft and against axial displacement relative to the shaft. A roller bearing assembly 42 is interposed between housing 24 and abutment ring 40, and a roller bearing assembly 44 is interposed between housing 24 and output shaft 38 adjacent end wall 34 of the housing. Bearing assemblies 42 and 44 support shaft 38 for rotation relative to housing 24 and against axial displacement relative thereto during rotation.

Drive mechanism 22 further includes a brake unit 46 on one side of abutment ring 40 and a clutch unit 48 on the opposite side of abutment ring 40. The brake and clutch units are described in greater detail hereinafter. Flywheel 28 of the drive mechanism includes a cylindrical outer portion 50 surrounding the corresponding end of housing 24, and a radially inwardly extending end portion 52. The flywheel is attached to a sleeve 54 which extends axially inwardly of the corresponding end of housing 24 in surrounding relationship with respect to shaft 38. A roller bearing assembly 56 is interposed between sleeve 54 and housing 24 to support the flywheel for rotation relative to the housing. End portion 52 of the flywheel is interconnected with sleeve 54 for rotation therewith such as by a key 58, and an end plate 60 is bolted to the outer end of sleeve 54 to retain the flywheel in axially mounted relationship with respect to the sleeve.

As described more fully hereinafter, the brake and clutch units are adapted to be actuated to achieve alternate braking and clutching functions by means of a primary brake and clutch actuator including a fluid operated piston and cylinder assembly 66 surrounding shaft 38 adjacent the end thereof underlying radial end portion 52 of the flywheel. In the embodiment illustrated, piston and cylinder assembly 66 is adapted to be actuated by oil under pressure and, for this purpose, the corresponding end of shaft 38 is provided with an axial passageway 68 and a plurality of radially extending passageways 70 leading from passage 68 to the piston and cylinder components. Passage 68, of course, is connected to a suitable source of oil under pressure, not illustrated. Further, as described in detail hereinafter, rotation of flywheel 28 relative to housing 24 is adapted to be stopped by actuation of brake and clutch units 46 and 48 to simultaneously achieve the respective braking and clutching functions thereof. In accordance with the present invention, such actuation of the brake and clutch units is achieved through cooperation of the primary actuator and an auxiliary actuator including piston and cylinder assembly 72 associated with end wall 34 of the housing. Piston and cylinder assembly 72 is adapted to be actuated by oil under pressure and, for this purpose, housing wall 34 is provided with a passageway 74 leading to the piston and cylinder assembly. Passageway 74, of course, is connected to a suitable source of oil under pressure, not illustrated.

Preferably, drive mechanism 22 is lubricated and cooled during operation by circulating a suitable fluid such as oil therethrough. For this purpose, housing 24 is provided with an inlet passage 76 connectable to a suitable source of cooling and lubricating fluid. Passage 76 communicates with radial passages 78 in shaft 38 which open into a longitudinal passage 80 in the shaft. Radial passages 82 open into longitudinal passages 84 in intermediate portion 38a of shaft 38, and a plurality of passages 86 open into the brake and clutch disc areas to distribute lubricating and cooling fluid to these components and to the interior of housing 24. Additionally, inlet passage 76 is connected by means of conduit 88 to a passage 90 leading into housing 24 in the area overlying bearing assembly 56. Accordingly, it will be appreciated that lubricating and cooling fluid is distributed within the housing to the various components of the assembly including the brake and clutch units and the bearing assemblies. The housing is further provided with a sump 92 having an outlet passage 94 for the cooling and lubricating fluid, whereby the fluid can be circulated through the housing and cooled exteriorly thereof if desired.

The structure and operation of the brake and clutch units and the primary actuator therefor will be best understood by referring to FIGS. 2, 3, 5 and 6 of the drawing. In this respect, brake and clutch units 46 and 48 include corresponding brake and clutch presser members 96 and 98, respectively. Presser members 96 and 98 are annular rings having corresponding splined interconnections 96a and 98a with shaft portion 38a so as to be rotatable with and axially displaceable relative to shaft 38 toward and away from the corresponding side of abutment ring 40. Brake assembly 46 further includes a plurality of brake discs 100 surrounding the corresponding end of intermediate portion 38a of shaft 38 and interengaged therewith such as by spline interconnections 102. In a well known manner, spline interconnections 102 provide for discs 100 to rotate with shaft 38 and to be axially slidable relative thereto. Similarly, clutch unit 48 includes a plurality of clutch discs 104 surrounding the corresponding end of intermediate portion 38a of the output shaft and interengaged therewith by splined interconnections 106, whereby discs 104 are rotatable with shaft 38 and are axially slidable relative thereto.

Figure 3:
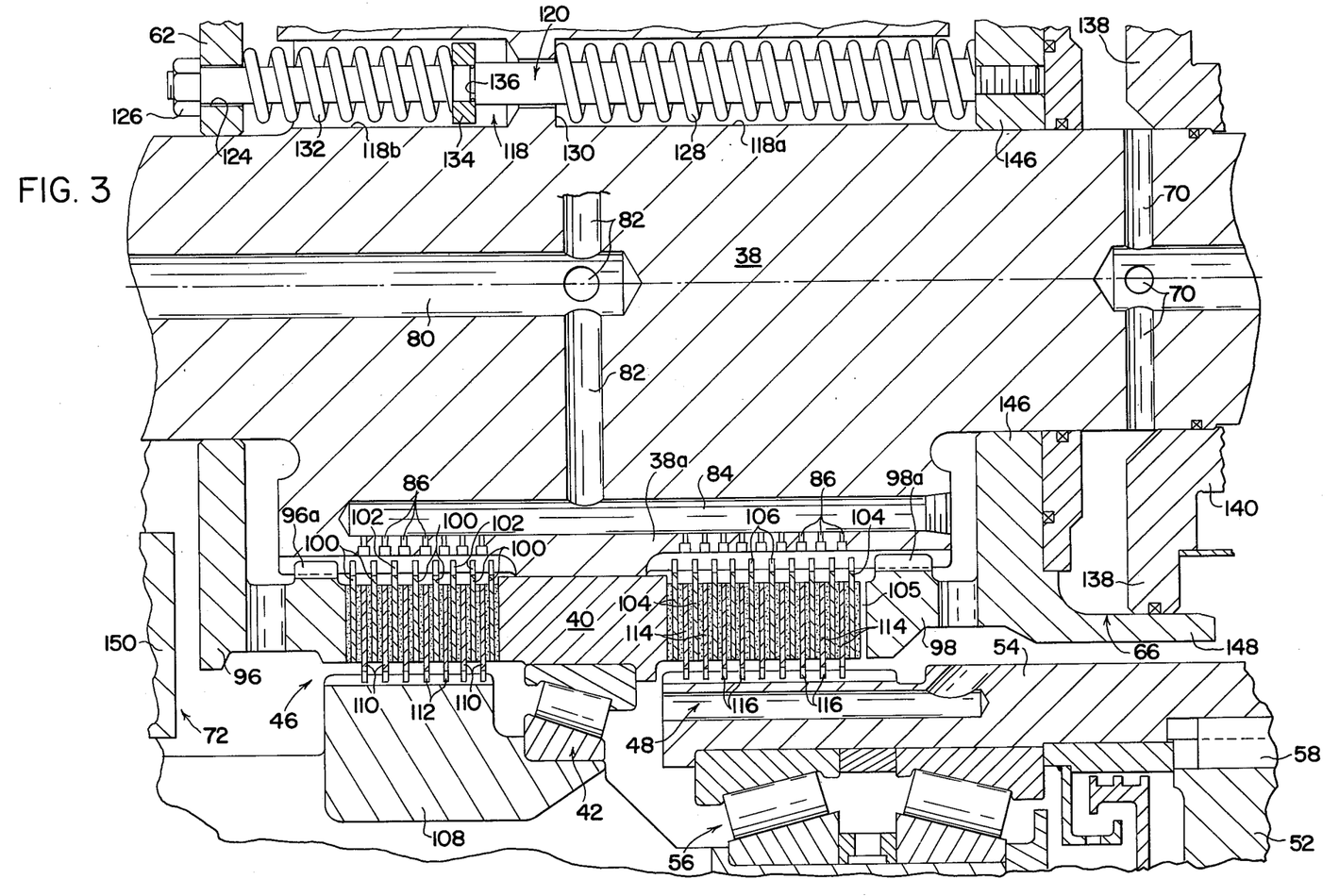
FIG. 3 is a detailed view, in section, showing the clutch and brake units and the primary actuator of the drive mechanism illustrated in FIG. 2.

Brake assembly 46 further includes a support ring 108 which is fixed with respect to housing 24 of the drive mechanism. Ring 108 supports a plurality of brake discs 110 each of which is interposed between a pair of brake discs 100. Brake discs 110 and ring 108 have splined interconnections 112 which provide for discs 110 to be fixed against rotation and to be axially slidable relative to support ring 108. Similarly, clutch assembly 48 further includes a plurality of clutch discs 114 having splined interconnections 116 with flywheel sleeve 54. Each of the discs 114 is interposed between a pair of the discs 104, and splined interconnections 116 provide for discs 114 to rotate with the flywheel and to be axially displaceable relative thereto.

Figure 5:
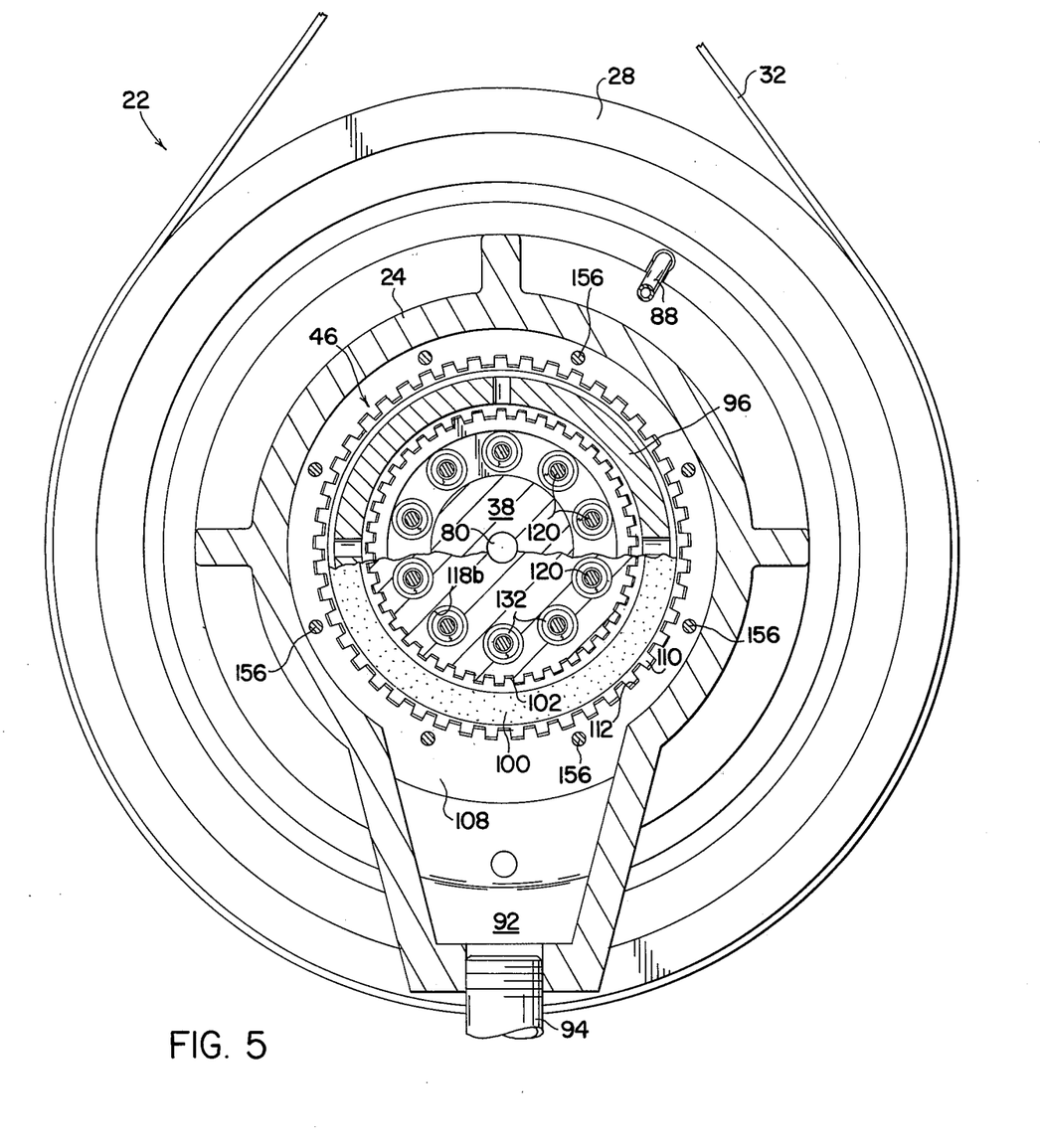
FIG. 5 is a cross-sectional view of the drive mechanism taken along line 5—5 in FIG. 2.
Figure 6:
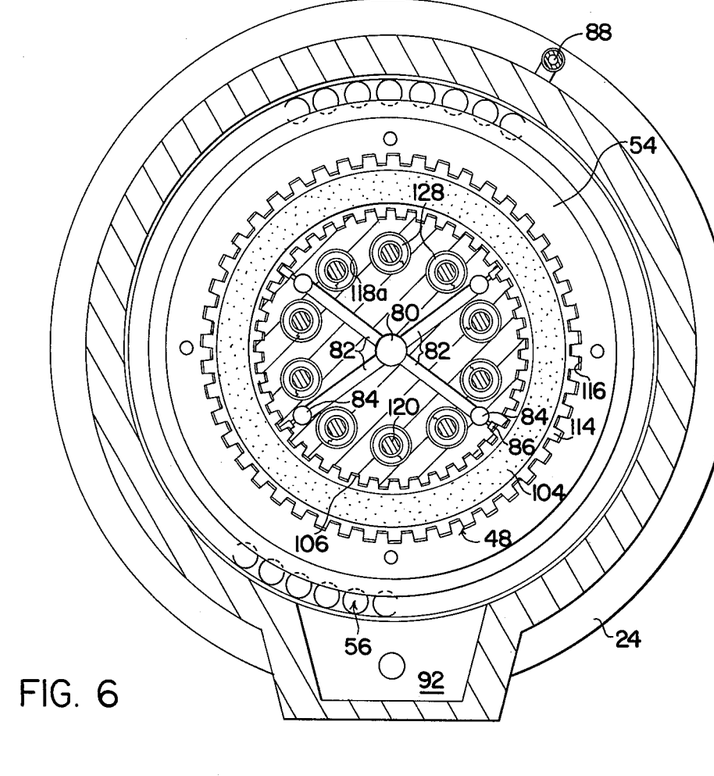
FIG. 6 is a cross-sectional view of the drive mechanism taken along line 6—6 in FIG. 2; and, FIG. 7 is a cross-sectional view of the drive mechanism taken along line 7—7 in FIG. 2.

Presser members 96 and 98 are mechanically interconnected for displacement together as a unit. In this respect, as illustrated in FIGS. 3 and 5, intermediate portion 38a of shaft 38 is provided with a plurality of longitudinally extending openings 118 receiving corresponding rigid connecting rods 120. Each opening 118 includes a first portion 118a having an outer end adjacent clutch presser member 98 and a second portion 118b having an outer end adjacent brake presser member 96. One end of each rod 120 is threadedly engaged with clutch presser member 98, and the other end of each rod is slidably received in an opening 124 in brake presser member 96. The latter end of rod 120 is provided with a nut 126 to limit axial separation between presser members 96 and 98. A biasing compression spring 128 surrounds each rod 120 in passage portion 118a and abuts against a shoulder 130 at one end of the passage portion and against clutch presser member 98 at the other end of the passage portion. Accordingly, springs 128 bias clutch presser member 98 and thus rods 120 and brake presser member 96 to the right as seen in FIG. 3. A biasing compression spring 132 surrounds each rod 120 in passage portion 118b and is axially captured between a stop washer 134 on rod 120 and brake presser member 96. Stop washer 134 abuts against a rod shoulder 136 to prevent displacement of the washer relative to rod 120 in the direction toward clutch presser member 98. Accordingly, it will be appreciated that brake presser member 96 is axially slidable relative to rods 120 in the direction toward and away from clutch presser member 98, and that movement of the brake presser member toward the clutch presser member is against the bias of springs 132.

It will be appreciated from the foregoing description that the brake and clutch units are adapted to be actuated by axially displacing presser members 96 and 98 relative to abutment ring 40 to alternately press the brake and clutch discs toward the corresponding face of abutment ring 40. In the positions of the components illustrated in FIG. 3, the brake is engaged and the clutch disengaged, whereby an axial space 105 exists between the inner face of clutch presser member 98 and the adjacent one of the clutch discs 104. When presser members 96 and 98 are axially displaced to the left in FIG. 3, the brake is disengaged and the clutch is engaged, whereby a similar space exists between the inner face of presser plate 96 and the adjacent one of the brake discs 100. These spaces assure release of the brake prior to engagement of the clutch and vice versa. Moreover, it will be appreciated that axial displacement of clutch presser member 98 to the left in FIG. 3 causes movement of brake presser member 96 therewith in that biasing springs 132 move with rods 120 and maintain brake A presser member 96 against nuts 126 on the corresponding ends of rods 120. Further, as mentioned hereinbefore such displacement of clutch presser member 98 is against the bias of springs 128 which accordingly bias the clutch and brake presser members toward the position shown in FIG. 3 and provide the braking force exerted against the brake discs by brake presser member 96.

With further reference to FIGS. 2 and 3, piston and cylinder assembly 66 of the primary brake and clutch actuator is comprised of piston and cylinder components coaxial with shaft 38 and operable to displace presser member 98, rods 120 and presser member 98 to the left to displace clutch discs 104 and 114 toward abutment ring 40. More particularly, an annular piston disc 138 having an axially extending hub 140 is mounted on shaft 38 for rotation therewith and against axial displacement relative thereto, such as by splined interconnection 142, collar 143 and retaining nut 144. Clutch presser member 98 includes an apertured radial wall 146 slidably receiving shaft 38, and an axially extending annular wall 148 slidably engaging the outer periphery of piston disc 138. The annular space between piston disc 138 and wall 146 of the clutch presser member defines a chamber adapted to receive oil under pressure through passageway 70. It will be appreciated, of course, that appropriate seals not designated numerically are provided to seal the chamber against the leakage of oil therefrom. It will be further appreciated that clutch presser member 98 could be a separate component from the cylinder portion of assembly 66 defined by walls 146 and 148.

In connection with the clutch and brake operation described hereinabove, it will be appreciated that oil under pressure introduced into the piston-cylinder chamber operates to displace presser member 98 and thus rods 120 of brake presser member 96 to the left from the position shown in FIGS. 2 and 3 and that, upon release of the oil pressure, springs 128 operate to return clutch presser member 98 and thus rods 120 and brake presser member 96 to the positions shown in FIG. 3.

Figure 4:
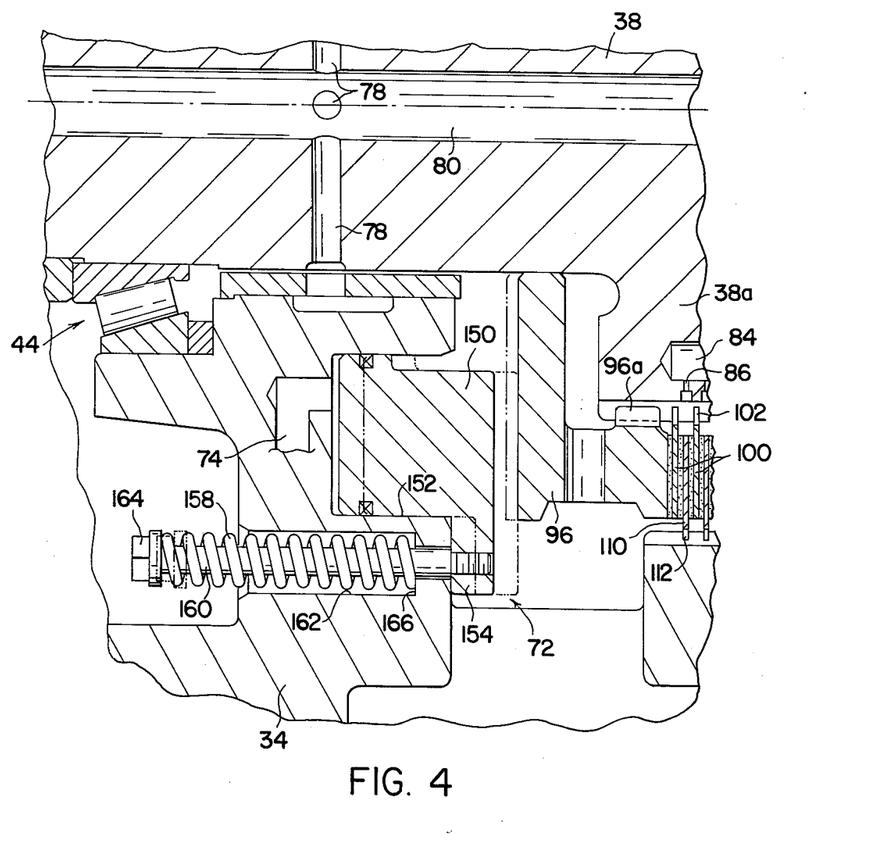
FIG. 4 is a detailed view, in section, of a portion of the brake unit and the auxiliary actuator of the drive mechanism shown in FIG. 2.
Figure 7:
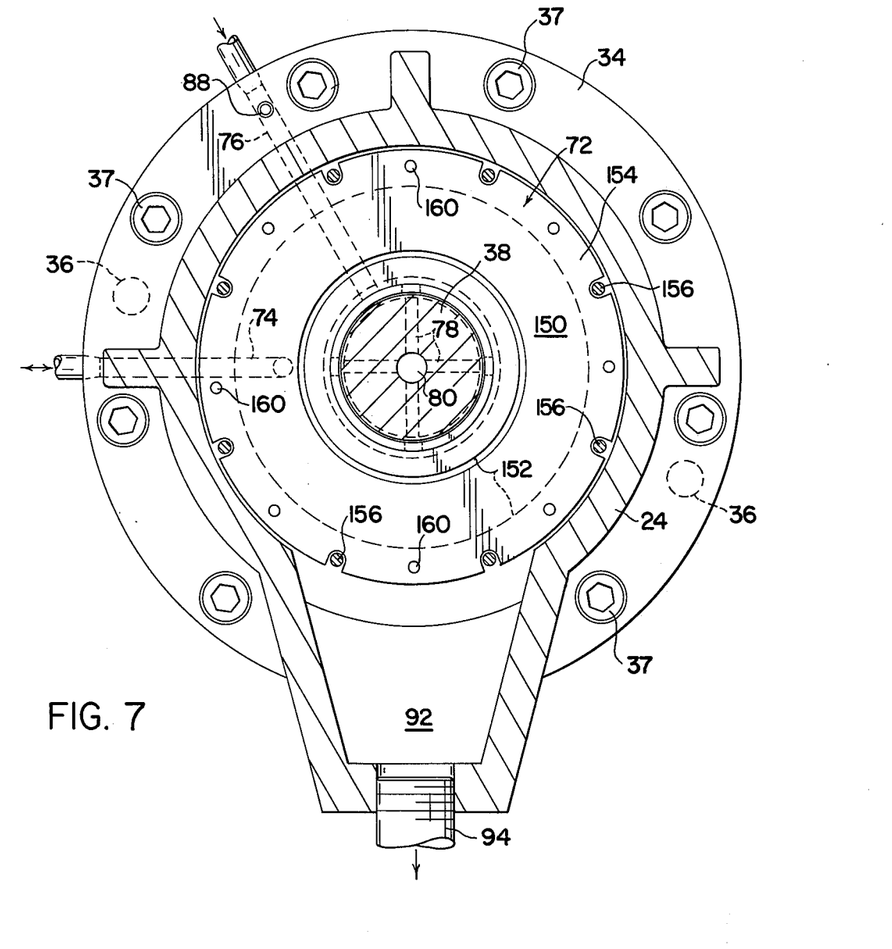

The structure and operation of the auxiliary actuator including piston and cylinder assembly 72 will be best understood with reference to FIGS. 2, 4 and 7 of the drawing. In this respect, piston and cylinder assembly 72 includes an annular piston member 150 slidably received in an annular recess 152 opening axially into end wall 34 of housing 24 and defining a cylinder for the piston. Piston 150 includes a radially extending flange 154, and a plurality of guide rods 156 extend through corresponding openings in housing wall 34 and flange 154 and have their inner ends threadedly engaged with corresponding openings in brake support ring 108. Rods 156 guide axial displacement of piston 150 and prevent rotation thereof relative to housing 24.

Piston 150 is axially reciprocable between a retracted position shown by solid lines in FIG. 4 and an extended position shown by broken lines and in which the piston is engaged with the brake presser member 96. Displacement of piston 150 to the extended position thereof is achieved by introducing oil under pressure into passage 74 which opens into the cylinder chamber behind the piston. Displacement of piston 150 to the retracted position is achieved by means of a plurality of biasing compression springs 158 operatively interconnected with piston 150 through corresponding spring rods 160. More particularly, rods 160 extend through corresponding stepped openings 162 in housing wall 34 and have inner ends threadedly interengaged with flange 154 of piston 150. The corresponding biasing spring 158 is captured between a head 164 on the rod and a shoulder 166 at the inner end of opening 162 in housing wall 34. Accordingly, displacement of piston 150 to the right as seen in FIG. 4 causes a corresponding displacement of rods 160 against the bias of springs 158. Accordingly, upon the release of oil under pressure behind piston 150, springs 158 displace the piston to its retracted position.

In the position of the components shown by solid lines in FIG. 4, brake presser member 96 and brake discs 100 and 110 are in the positions corresponding to that shown in FIG. 3. In this respect, the brake is engaged to stop rotation of output shaft 38, and the clutch is released whereby flywheel 28 is free to rotate relative to housing 24 and shaft 38. As mentioned hereinabove, the introduction of oil under pressure into the space between piston disc 138 and walls 146 and 148 of presser member 98 causes release of the brake and engagement of the clutch by shifting presser members 96 and 98 to the left from the positions shown in FIG. 3. Thus, output shaft 38 is free to rotate relative to housing 24 and is rotated by the flywheel through the clutch. With the brake released, brake presser member 96 is in the broken line position shown in FIG. 4.

Should it be desired to stop rotation of output shaft 38 and flywheel 28 oil under pressure is released from piston and cylinder assembly 66. Thereupon, biasing springs 128 displace presser members 96 and 98 to the positions shown in FIG. 3 to engage the brake, disengage the clutch and thus stop shaft 38. Then, oil under pressure is introduced behind piston 150 of the auxiliary actuator, whereby piston 150 is extended to engage brake presser member 96 and to apply pressure thereagainst in the direction toward abutment ring 40, thus in effect locking the brake against disengagement. Rotation of the flywheel is then stopped by introducing oil under pressure into the chamber of piston and cylinder assembly 66, thus to displace clutch presser member 98 toward abutment ring 40 to engage the clutch and stop rotation of the flywheel.

With piston 150 in the extended position, displacement of clutch presser member 98 toward abutment ring 40 results in displacement of actuator rods 120 relative to brake presser member 96 against the bias of springs 132, such displacement being enabled by the sliding engagement between rods 120 and brake presser member 96 described herein. Upon first releasing the oil pressure behind piston 150, springs 132 bias brake presser member 96 toward nuts 126 on the ends of rods 120, thus to release the brake. Similarly, by first releasing oil under pressure from the chamber of piston and cylinder assembly 66 clutch presser member 98 is displaced away from abutment ring 40 by springs 128 thus to release the clutch and to displace actuator rods 120 relative to brake presser member 96.

It will be appreciated from the foregoing description regarding stoppage of the output shaft and flywheel that the clutching force providing for stoppage of the flywheel corresponds to the oil pressure in the chamber of assembly 66, the area of wall 146 of clutch presser member 98 against which the oil acts, and the opposing force of biasing springs 128 and 132 which are both compressed during a flywheel braking operation. In order to prevent the brake being overpowered by the flywheel and clutch during stoppage of the flywheel, the brake holding force applied by piston 150 should be greater than the effective force on the clutch. This can be achieved in a variety of different ways. For example, the oil pressure applied behind piston 150 could be of sufficient magnitude to assure the desired braking force. In the preferred embodiment, however, the oil for actuating both the primary and auxiliary mechanisms is from a common source and at a common pressure so as to avoid problems in connection with multiple supply and adjustments to maintain desired pressures or pressure relationships for the two actuators. Therefore, the desired braking force in relationship to the effective clutching force during braking of the flywheel is achieved by providing for the area of piston 150 against which the oil acts to be sufficiently large to assure a braking force greater than the effective clutching force.

While considerable emphasis has been placed herein on a preferred structure and structural interrelationship between the component parts of the drive unit of the present invention, it will be appreciated that many changes and modifications can be made without departing from the principles of the invention. Further, while a particular operating sequence has been described with regard to achieving braking of the output shaft and stoppage of the flywheel, it will be appreciated that this is merely a preferred sequence and that other sequences of operation are possible. For example, piston 150 could be actuated to its extended position while the clutch is engaged and the output shaft is rotating with the flywheel. This actuation of piston 150 would cause the latter to engage brake presser member 96 and displace the latter axially along rods 120 toward abutment ring 40 to engage the brake discs and thus top both the output shaft and flywheel. Further, with both the flywheel and output shafts stopped through operation of the primary and auxiliary actuators, oil under pressure in the chambers of the two piston and cyliner assemblies can be released simultaneously or sequentially and, if sequentially, either can be released before the other.

While the auxiliary operating assembly is associated with the brake unit in the preferred embodiment, it could be associated with the clutch unit. In this respect, for example, the brake presser plate could be attached to the corresponding ends of rods 120 against axial displacement relative thereto, and the clutch presser member could be slidably associated with the corresponding ends of the rods and spring biased relative thereto in the direction away from abutment ring 40. These ends of the rods would then extend through wall 146 of the clutch presser member and be attached to a cylinder component separate from the clutch presser member and cooperable with piston disc 138 to provide a receiving chamber therebetween for oil under pressure. A second piston and cylinder arrangement could then be provided coaxial with the primary actuator and which would be operable to displace the clutch presser member toward abutment ring 40 and relative to rods 120. Thus, reciprocation of the brake and clutch presser members by means of the primary operating assembly and biasing springs 128 would cause alternate brake and clutch engagement in a manner similar to that of the preferred embodiment. Then, with the brake engaged by the biasing forces of springs 128 as in the preferred embodiment, the auxiliary operator could be actuated to displace the clutch presser member relative to rods 120 and toward abutment ring 40 to engage the clutch and thus stop rotation of the flywheel. Many embodiments for achieving alternate brake and clutch actuation through a primary operating mechanism and selective actuation of an auxiliary operating mechanism to achieve simultaneous braking of the shaft and flywheel will be suggested or obvious to those skilled in the art.

In addition to possible modifications of the primary and auxiliary actuators and the brake and clutch presser member assembly which the desired clutching and braking functions can be achieved in accordance with the present invention, it will be appreciated that the primary and auxiliary actuators themselves can be modified from the specific piston-cylinder arrangements specifically disclosed herein. In this respect, for example, the primary actuator could readily be modified to provide for the cylinder component thereof to be fixed and the piston component movable and interconnected with the clutch presser member. Likewise, the auxiliary actuator could be modified to provide for a structural arrangement in which a cylinder component would be displaceable relative to the housing as opposed to a piston component. Additionally, it will be appreciated that a plurality of piston and cylinder assemblies could be employed in place of a single annular arrangement as shown and described herein.

As many possible embodiments of the present invention may be made, and as many changes may be made in the embodiment herein illustrated and described without departing from the principles of the present invention, it is to be distinctly understood that the foregoing descriptive matter is to be interpreted merely as illustrative of the present invention and not as a limitation.

What is claimed is:

1. A press drive mechanism comprising, a housing, shaft means extending through said housing and supported for rotation relative thereto about an axis, a flywheel coaxial with said shaft means and supported for rotation relative thereto and to said housing, clutch disc means cooperatively supported relative to said shaft means and said flywheel, brake disc means cooperatively supported relative to said housing and said shaft means, said brake disc means being axially spaced from said clutch disc means, abutment means fixed on said shaft means between said clutch disc means and brake disc means, a clutch disc presser member, a brake disc presser member, carrier means axially reciprocable between first and second positions relative to said fixed abutment means, one of said clutch and brake presser members being axially fixed on said carrier means and engaging the corresponding one of said clutch and brake disc means with said abutment means when said carrier means is in said first position, the other of said clutch and brake presser members being axially displaceable with and relative to said carrier means and engaging the other of said clutch and brake disc means with said abutment means when said carrier means is in said second position, actuating means for reciprocating said carrier means between said first and second positions, and means selectively operable to position said other presser member to engage said other disc means with said abutment means when said carrier means is in said first position.

2. The drive mechanism according to claim 1, wherein said actuating means includes fluid operated piston and cylinder means coaxial with said shaft means and including piston and cylinder components, one of said components being axially fixed relative to said shaft means, and the other of said components being axially reciprocable relative to said one component and interconnected with said carrier means.

3. The drive mechanism according to claim 2, wherein said actuating means further includes spring means biasing said carrier means toward said second position thereof.

4. The drive mechanism according to claim 1, wherein said selectively operable means is fluid operated piston and cylinder means including piston and cylinder components, one of said components being axially fixed relative to said shaft means, and the other of said components being axially reciprocable between extended and retracted positions relative to said other presser member, said other component when extended engaging said other presser member in the direction toward said abutment means.

5. The drive mechanism according to claim 1, wherein said clutch presser member is axially fixed on said carrier means and said brake presser member is axially displaceable with and relative to said carrier means.

6. A press drive mechanism comprising, a housing, shaft means extending through said housing, bearing means within said housing supporting said shaft means for rotation relative to said housing about an axis, a flywheel at one end of said housing and having a first portion extending into the corresponding end of said housing and surrounding an axial portion of said shaft means, bearing means between said housing and first position of said flywheel supporting said flywheel for rotation relative to said housing and shaft means, clutch disc means cooperatively supported relative to said shaft means and said first portion of said flywheel, brake disc means cooperatively supported relative to said housing and said shaft means, said brake disc means being axially spaced from said clutch disc means in the direction from said one end of the housing toward the other, fixed abutment means on said shaft means between said clutch disc means and brake disc means, axially opposed clutch and brake disc engaging members movable in axially opposite directions to alternately displace said clutch disc means and said brake disc means in the corresponding direction toward said fixed abutment means, axially recriprocable carrier means, said clutch disc engaging member being axially fixed on said carrier means and said brake disc engaging member being supported by said carrier means for axial displacement therewith and relative thereto, actuating means including piston means and cylinder means, said piston means surrounding said shaft means and fixed with respect thereto at the end of the shaft means corresponding to said one end of said housing, said cylinder means being interconnected with said clutch disc engaging memeber and axially displaceable in opposite directions relative to said piston means to reciprocate said carrier means and move said disc engaging members in said opposite directions, and selectively operable means at the other end of said housing for engaging said brake disc engaging member in the direction of said abutment means independent of reciprocation of said carrier means by said actuating means.

7. A press drive mechanism comprising, a housing, shaft means extending through said housing and supported for rotation relative thereto about an axis, a flywheel coaxial with said shaft means and supported for rotation relative thereto and to said housing, clutch disc means cooperatively supported relative to said shaft means and said flywheel, brake disc means cooperatively supported relative to said housing and said shaft means, said brake disc means being axially spaced from said clutch disc means, abutment means on said shaft means between said clutch disc means and brake disc means, a clutch disc presser member, a brake disc presser member, carrier means axially reciprocable between first and second positions relative to said fixed abutment means, one of said clutch and brake presser members being axially fixed on said carrier means and engaging the corresponding one of said clutch and brake disc means with said abutment means when said carrier means is in said first position, the other of said clutch and brake presser members being axially displaceable with and relative to said carrier means and engaging the other of said clutch and brake disc means with said abutment means when said carrier means is in said second position, actuating means for reciprocating said carrier means between said first and second positions, means selectively operable to position said other presser member to engage said other disc means with said abutment when said carrier means is in said first position, said clutch presser member being axially fixed on said carrier means and said brake presser member being axially displaceable with and relative to said carrier means, said carrier means including rod means extending axially of said shaft means and having opposite ends, said one presser member being fixed on one of said ends, the other of said presser members being slidably supported at the other of said ends for displacement toward said one presser member, and presser member spring means biasing said other presser member in the direction away from said one presser member.

8. The drive mechanism according to claim 7, wherein said selectively operable means includes annular cylinder means in said housing coaxial with said shaft means and annular piston means reciprocable in said cylinder means between extended and retracted positions and having an outer end, said outer end of said piston means engaging said brake presser member in the direction toward said abutment means when said piston means moves from the retracted to the extended position thereof.

9. The drive mechanism according to claim 8, wherein said actuating means includes fluid motor means to displace said carrier means from said first to said second position thereof and carrier spring means biasing said carrier means from said second to said first position thereof.

10. The drive mechanism according to claim 9, wherein said fluid motor means includes annular piston means on said shaft and cylinder means receiving said piston means and reciprocable relative thereto axially of said shaft, said cylinder means being interconnected with said clutch presser member.

11. A press drive mechanism comprising, a housing, shaft means extending through said housing, bearing means within said housing supporting said shaft means for rotation relative to said housing about an axis, a flywheel at one end of said housing and having a first portion extending into the corresponding end of said housing and surrounding an axial portion of said shaft means, bearing means between said housing and first portion of said flywheel supporting said flywheel for rotation relative to said housing and shaft means, clutch disc means cooperatively supported relative to said shaft means and said first portion of said flywheel, brake disc means cooperatively supported relative to said housing and said shaft means, said brake disc means being axially spaced from said clutch disc means in the direction from said one end of the housing toward the other, fixed abutment means on said shaft means between said clutch disc means and brake disc means, axially opposed clutch and brake disc engaging members movable in axially opposite directions to alternately displace said clutch disc means and said brake disc means in the corresponding direction toward said fixed abutment means, axially reciprocable carrier means, said clutch disc engaging member being axially fixed on said carrier means and said brake disc engaging member being supported by said carrier means for axial displacement therewith and relative thereto, actuating means including piston means and cylinder means, said piston means surrounding said shaft means and fixed with respect thereto at the end of the shaft means corresponding to said one end of said housing, said cylinder means being interconnected with said clutch disc engaging member and axially displaceable in opposite directions relative to said piston means to reciprocate said carrier means and move said disc engaging members in said opposite directions, selectively operable means at the other end of said housing for engaging said brake disc engaging member in the direction of said abutment means independent of reciprocation of said carrier means by said actuating means, said selectively operable means including second cylinder means axially fixed with respect to said housing and second piston means in said cylinder means and axially reciprocable between extended and retracted positions, and said second piston means having an outer end for engaging said brake disc engaging member when said second piston means is in said extended position.

12. The drive mechanism according to claim 11, wherein said second cylinder means and second piston means are annular and coaxial with said shaft means.

13. The drive mechanism according to claim 12, and spring means biasing said second piston means toward the retracted position thereof.

14. The drive mechanism according to claim 11, wherein said carrier means includes axially extending rod means having opposite ends, said clutch disc engaging member being fixed on one of said opposite ends, said brake disc engaging member being slidably supported on the other of said opposite ends for axial movement toward and away from said clutch disc engaging member, and first spring means biasing said brake disc engaging member in the direction away from said clutch disc engaging member.

15. The drive mechanism according to claim 14, and second spring means biasing said carrier means in the direction to move said brake disc engaging member toward said abutment means.

16. The drive mechanism according to claim 15, wherein said second cylinder means and second piston means are annular and coaxial with said shaft means, and third spring means biasing said second piston means toward the retracted position thereof.

17. A press drive mechanism comprising, a housing, shaft means extending through said housing and supported for rotation relative thereto about an axis, a flywheel coaxial with said shaft means and supported for rotation relative thereto and to said housing, clutch disc means cooperatively supported relative to said shaft means and said flywheel, brake disc means cooperatively supported relative to said housing and said shaft means, abutment means for said clutch and brake disc means, clutch disc presser means, brake disc presser means, means interengaging said clutch and brake presser means for movement as a unit in axially opposite directions and supporting said clutch and brake presser means for axial movement relative to one another, said clutch and brake presser means, clutch and brake disc means and abutment means being relatively positioned for said movement of said presser means as a unit in axially opposite directions to alternately engage said clutch and brake disc means with said abutment means and for said relative axial movement between said presser means to enable simultaneous engagement of said brake and clutch disc means with said abutment means, and means to move said clutch and brake presser means as a unit and relative to one another, said interengaging means including axially reciprocable connector means, one of said clutch and brake presser means being axially fixed with respect to said connector means and the other being axially reciprocable relative to said connector means between first and second presser means positions, and means biasing said other of said clutch and brake presser means toward said first presser means position, said means to move said clutch and brake presser means including first and second actuating means, said first actuating means reciprocating said connector means in axially opposite directions between first and second connector positions, and said second actuating means positioning said other presser means in said second presser means position relative to said connector means when said connector means is in said first connector position.

18. The drive mechanism according to claim 17, wherein said first actuating means includes fluid piston and cylinder means for displacing said connector means in one of said axially opposite directions and spring means biasing said connector means in the other of said axially opposite directions.

19. A press drive mechanism comprising, a housing, shaft means extending through said housing and supported for rotation relative thereto about an axis, a flywheel coaxial with said shaft means and supported for rotation relative thereto and to said housing, clutch disc means cooperatively supported relative to said shaft means and said flywheel, brake disc means cooperatively supported relative to said housing and said shaft means, abutment means for said clutch and brake disc means, clutch disc presser means, brake disc presser means, means interengaging said clutch and brake presser means for movement as a unit in axially opposite directions and supporting said clutch and brake presser means for axial movement relative to one another, said clutch and brake presser means, clutch and brake disc means and abutment means being relatively positioned for said movement of said presser means as a unit in axially opposite directions to alternately engage said clutch and brake disc means with said abutment means and for said relative axial movement between said presser means to enable simultaneous engagement of said brake and clutch disc means with said abutment means, and means to move said clutch and brake presser means as a unit and relative to one another, said interengaging means including axially reciprocable connector means, one of said clutch and brake presser means being axially fixed with respect to said connector means and the other being axially reciprocable relative to said connector means between first and second presser means positions, means biasing said other of said clutch and brake presser means toward said first presser means position, said clutch presser means being axially fixed relative to said connector means and said brake presser means being axially movable relative to said connector means, said means to move said clutch and brake presser means including first and second actuating means, said first actuating means displacing said connector means in axially opposite directions between a first connector position in which said brake presser means engages said brake disc means with said abutment means and a second connector position in which said clutch presser means engages said clutch disc means with said abutment means, and said second actuating means being selectively operable to maintain said brake presser means in a holding position engaging said brake disc means with said abutment means during movement of said connector means from said first connector position to said second connector position.

20. The drive mechanism according to claim 19, wherein said first actuating means includes fluid piston and cylinder means for displacing said connector means from said first to said second connector position and spring means biasing said connector means from said second to said first connector position.

21. The drive mechanism according to claim 20, wherein said second actuating means includes fluid piston and cylinder means including piston means axially reciprocable between a first piston position engaging said brake presser means in said holding position and a second piston position releasing said brake presser plate means for displacement with said connector means.

22. The drive mechanism according to claim 21, wherein said second actuating means further includes spring means biasing said piston means toward said second piston position.

* * * * *

Disclaimer 4,122,926.—*Edwin A. Spanke*, Oak Forest, *Louis F. Carrieri*, LaGrange Park, and *Melvin H. Francey*, Palos Heights, Ill. FLUID OPERATED CLUTCH AND BRAKE. Patent dated Oct. 31, 1978. Disclaimer filed July 11, 1979, by the assignee, *Gulf & Western Manufacturing Company*.

Hereby enters this disclaimer to claims 17 and 18 of said patent.

[*Official Gazette August 28, 1979.*]